United States Patent Office 3,172,220
Patented Mar. 9, 1965

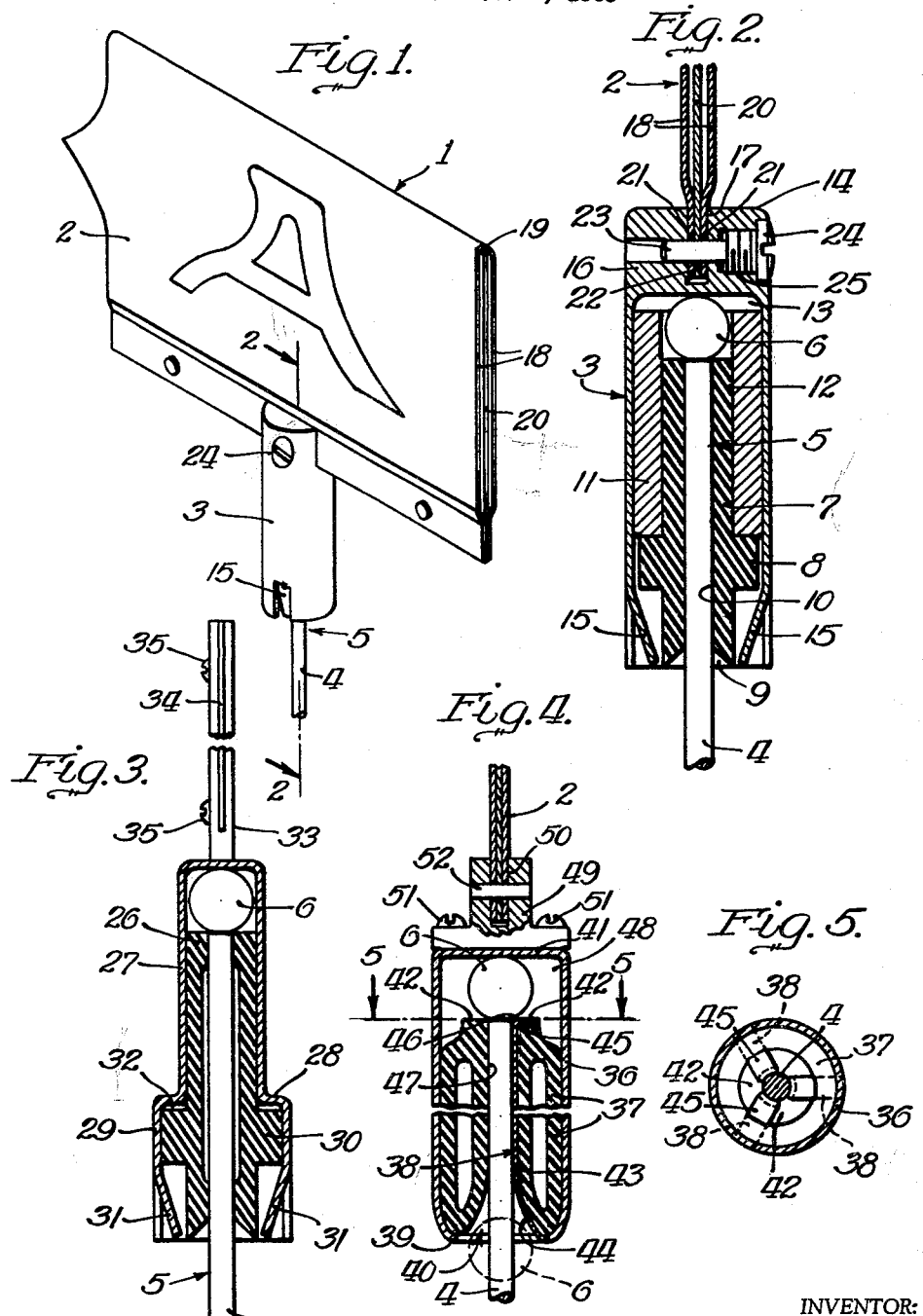

3,172,220
DISPLAY DEVICE
Leonard R. Christensen, 4205 Fullerton Ave.,
Chicago, Ill.
Filed Feb. 6, 1963, Ser. No. 256,695
10 Claims. (Cl. 40—39)

This invention relates to a device adapted for and useful as an advertising novelty or as an ornamental assembly attractively displayed to provide means for visual perusal and observance.

More specifically, this invention is directed to a simple assembly comprising a display means for viewing which includes unique attachment mechanism to mount the assembly on a support for view and for attention attracting motion.

One of the objects of the display device of this invention is to provide a novel assembly carrying printed or decorative matter in a given relation upon a suitable extended support, such as an automobile antenna or mast or the like, and to provide means permitting said assembly to be movable upon its support to attract attention thereto to enhance the display purpose of the device. In this connection, motion of the display device need not be of a continuous nature although it will be under certain conditions of operation. Relative motion of the device with respect to the support will be intermittent, halted or it may assume numerous variations of permissible movement. The motion is primarily rotary, but also whip like due to the whipping of the support and the flexible mounting of the display device on the support.

Another object of the present invention is to provide a display device bearing indicia means or certain configurations any or all of which can be mounted upon a supplied or convenient support for open view, with a new and novel mechanism joining the device and support, said mechanism cooperating with the support or with a support part to permit the display device freedom for rotation or other motion relatively to the support.

Other objects and advantages such as retention means, orientation means, bearing details, etc., all embodied in the display device herein disclosed shall hereinafter be pointed out or become apparent from the following detailed description having reference to the accompanying drawing forming a part of this specification.

In the drawings:

FIG. 1 is a perspective view of the display device of the invention assembled upon an upright support, which support in the illustration comprises the fragmentary top terminal portion of an automobile radio antenna;

FIG. 2 is a vertical cross sectional view of the display device as the internal structure thereof is seen substantially in the plane of the line 2—2 in FIG. 1;

FIG. 3 is a vertical cross sectional view of a modified construction of a display device;

FIG. 4 is a further modified arrangement; and

FIG. 5 is a plan sectional view taken along the plane of line 5—5 in FIG. 4.

In the drawings, the display device 1 comprises an assembly having a viewing unit 2 carried by a holder 3 which is operatively connected with a support rod 4, which by way of example is here shown as an automobile radio antenna 5.

Antenna 5 is of the conventional form having rod 4 terminating with a protective ball 6 rigid with the rod 4. Other similar structures may be employed as supports for the display device having rod members provided with enlarged end members as protective and decorative terminal pieces.

The holder 3 is shown in section in FIG. 2 and comprises a plurality of sleeve elements arranged to connect the holder with the rod 4 and vertically to either side of the ball 6. Rod 4 and ball 6 provide the bearing pieces about which and upon which the holder 3 may freely rotate and move at will.

Holder 3 includes an inner orientation sleeve 7 constructed of resilient material such as soft neoprene, sponge rubber or analogous material, the sleeve having an outer annular ring 8 intermediate its length and the sleeve terminates with an inwardly convergent end 9 formed about the central bore or hole 10 in the sleeve.

A rigid bearing sleeve 11 encircles the upper end 12 of the orientation sleeve 7 and rests upon the sleeve ring 8, sleeve 11 being longer than sleeve portion 12 to provide a socket area or pocket 13 for ball 6 of rod 4. A cap sleeve 14 is externally arranged about the above described sleeves to seat upon ball 6 and to enclose the sleeves, the ball 6 providing a point contact bearing to permit the cap sleeve 14 to rotate about the general upright axis of rod 4 while the bearing sleeve 11 provides the internal bearing for the cap sleeve 14.

Additionally, cap sleeve 14 has suitable clip pieces 15, normally straight during assembly, that can be bent inwardly radially toward the central inner sleeve 7 and preferably under the ring 8 to provide suitable retention means to keep the holder 3 in place upon the antenna 5.

The upper end of the cap sleeve 14 has a head 16 made with a radial slot 17 to receive and hold a selected display assembly such as 2. The assembly 2 is the viewing unit comprising, as here shown, a transparent cover 18 folded at 19 to form two outer side pieces that will confine display material printed upon a removable and displaceable card such as 20.

Unit 2 is made to enter and to seat into slot 17. The cover and card as provided with suitable aligned openings 21 and 22 to accommodate the smooth locking end 23 of a screw 24 threaded into the head bore 25 so that the display means can be removed, replaced and changed easily to obtain the desired results contemplated.

To connect the display device with a support having an enlarged head end, sleeve 12 is forced over the ball 6 by spreading the. sleeve. with the ball entering the bore 10, through the inwardly convergent end 9 of sleeve 7 until the ball appears beyond the top of the sleeve 7. Bearing sleeve 11 is slipped into place over sleeve 7 and then the cap sleeve follows over both sleeves 7 and 11 to a point where the cap rests upon the ball 6. The clip pieces 15 are then bent inwardly by use of any suitable tool and the assembly is completed. Display selections are easily made regarding the viewing unit 2 either before or after assembly. Obviously, display arrangements can readily be changed any time after assembly since that is the purpose of this device as a display instrumentality.

Thus a holder such as 3 provides a novel assembly useful in mounting a display instrumentality upon a support such as a headed automobile radio antenna wherein the holder is free to revolve about the antenna rod axis to attract attention to the display, the resiliency of the antenna rod further contributing active motion to the display as an added attention drawing factor.

In this device, the rotation of the holder may be slowed frictionally by forcing the clips 15 harder against the resilient annular ring 8 causing added gripping action of the ring of sleeve 7 against the adjacent end portion of the bearing sleeve 11. This is a matter of regulation according to the type of display being used and according to the visual purpose thereof. Thus sleeve 7 tightens on rod 4.

It is to be understood that the resilient central core sleeve 7 forms a sound dampening means to absorb unwanted vibratory noises that may be set up by the fluttering and/or revolving display means when acted upon by the wind or by car motion. These noises are quieted and are not transmitted through the antenna to the body of the car by the resilient internal structure of the holder 3.

Attention is further directed to the inherent facility of the holder to function as a resiliently attached unit permitting limited flexing of the display device relatively to the supporting rod. This action will reduce active strain transmittal from the viewing assembly to the holder and to the supporting rod and will also actively contribute to the dampening of vibratory noises set up by the display means to thus lessen the possibility of noise transfer to the rod structure and to the car body.

The modified construction of the display device shown in FIG. 3 provides an arrangement wherein the resilient core or center sleeve 26, similar to sleeve 7, rotates directly about rod 4 and a cap sleeve 27 slides over the sleeve 26 down to a point where its top end rests upon ball 6. Offset 28 terminates with an enlarged cup end 29 that encircles the annular ring 30 of sleeve 26. Suitable ears or clip pieces 31 are provided on cup end 29 which can be bent inwardly under the ring 30 to keep the holder parts together and in operative relation to the rod 4 and ball 6. By adding to the pressure of the clip pieces 31 against ring 30, sleeve 26 can be tightened frictionally against the ball 6 and compressed somewhat within the tube or sleeve 27 to increase frictional contact of sleeve 26 with rod 4, certain clearance being provided at 32 to enhance this adjustable regulation.

The display means ornamental or otherwise bearing selected indicia may be similar to that previously described and such means like 2 can be inserted into an upright carrier 33 and into a slot 34 therein to be fastened or releasably held in place by screws 35 or the like. The upright carrier 33 is a post secured or otherwise connected with the top of the cap sleeve 27.

A further modified construction is also illustrated in FIGS. 4 and 5 comprising a rigid outer holder case 36 having an internal resilient core bearing member 37 including one or more spring clips 38 vertically embedded into the bearing member 37. The case 36 is inwardly shaped at the bottom to form flange 39 to hook under the bearing member 37, the mouth 40 of the flange being large enough to admit the ball 6 or like member on the rod 4 or the like. Suitable clearance is established between the top 41 of the case 36 and the upper face 42 of the core member 37 to accommodate ball 6, any variance in the ball size being taken care of by the resilience of the upper face 42 of the core member 37.

The spring clips 38 in FIG. 4 are three in number as seen in FIG. 5 and each has a midportion bearing leg 43, a ball entrance curve cam section 44 and a radial outward lip 45 provided with a sharp corner at 46 to engage the underside of ball 6.

By bodily pushing the holder of FIG. 4 over the ball 6 and the end of rod 4, the core member opens to let the ball pass through its central opening or hole 47, the spring legs and cam sections 44 thereof let the ball through until the ball enters the cavity 48 with the top 41 of case 36 resting upon the ball 6.

In this latter structure, the three spring legs 43 and adjacent annular portions of part 37 at the central opening 47 form the bearing surfaces meeting the rod 4 sides. Flexibility is maintained between the holder and rod as in the other forms of the invention and noise reducing facilities are maintained.

A head 49 with slot 50 for the display means 2 is mounted on the holder case 36 with suitable means such as screws 51. Lock means such as a pin, screw or the like, 52 retains the display unit 2 much the same as in the FIG. 2 form of the device.

The foregoing description is directed to certain exemplary forms of the invention to disclose the concept herein developed. Certain changes in the individual elements and in the different combinations thereof are contemplated without involving a departure from the fundamental concept of the invention. The extent of such modifications shall, however, be governed by the breadth and scope of the language appearing in the hereinafter claimed subject matter directed to the display device of this invention.

What I claim is:

1. A display device for attachment with a rod having a terminal end enlargement thereon comprising a holder carrying a visual display means, said holder comprising an internal core sleeve to fit the rod, an external sleeve carried about said core sleeve and extending beyond one end thereof to form a cavity therewith to receive the rod end enlargement therein, and a cap sleeve to enclose said sleeves, said cap sleeve freely resting upon said end enlargement of said rod for free rotation on said end and about said internal and external sleeves hereinbefore defined.

2. In the device of claim 1 wherein said internal sleeve is constructed of resilient deformable material and said external sleeve is constructed of rigid material to provide a bearing member for said cap sleeve.

3. In the device of claim 1 wherein one of said sleeve members is provided with clip pieces bendable for contact with one of the other of said sleeves to lock the sleeve assembly of said holder upon the rod support.

4. In the device of claim 1 wherein said cap sleeve carries a head disposed over said end enlargement of said rod, and said display means are releasably secured upon said head to move directly with the holder whenever the holder moves relatively to the rod.

5. A display device for an auto to fit over a headed antenna tip of an auto radio or the like and to movably respond to air currents and to car motion to establish bodily and rotative motion of the device relative to the auto, comprising, in combination, an antenna rod, an enlarged head on said rod, a holder carrying display means and being adapted to surround said rod and head, said holder providing sleeve means to engage said rod to provide bearing structure for the rotation of the holder with respect to the rod, one of said sleeve means having engagement with the underside portion of said rod head, at least one other of said sleeve means having a transverse surface area thereon to rest freely upon the top side of said enlarged antenna head, a display member connected with said holder for concerted motion with the holder, and retention means for said holder to maintain the latter in operative relation with respect to the supporting antenna.

6. The device of claim 5, wherein said retention means comprises a hollow deformable rod receiving sleeve adapted to admit the enlarged head of the antenna into the holder, said sleeve having limited frictional contact with the rod to control the speed of rotation of said holder on said rod.

7. The device of claim 5, wherein the retention means include clip pieces bendable into predetermined relations with respect to the sleeve assembly and said rod.

8. The device of claim 6 with the addition of spring clips located about the hollow part of the deformable rod receiving sleeve, said sleeve and clips together providing a flared entry throat to receive the headed antenna rod therethrough, and said clips terminating with radially formed lips to engage beneath and about the surface of the rod head to confine said head in a space over the deformable sleeve and against the transverse surface of said one sleeve thus orienting said holder on the antenna.

9. A display device for a rod support having an enlarged tip at its end comprising a slip-on holder forming a sleeve assembly for rotatable mounting at the tip of said rod, a display piece on said holder to imitate the motions of said holder, and said sleeve assembly comprising a resilient core member freely fitted upon the rod, a rigid cap holder forming case enclosing said core member, said member and cap being vertically spaced to confine said enlarged tip of the rod in the case and over said core member to orient said assembly upon the rod support with the assembly freely rotatably carried upon the rod support and its tip.

10. A display device as in claim 9 with the addition of spring clips spaced in the sleeve assembly for limited contact with said rod as added bearing members, said clips providing detent end parts to seat under the enlarged rod head for further stabilization of the holder in operative relation to said rod and tip.

References Cited by the Examiner
UNITED STATES PATENTS

| | | | |
|---|---|---|---|
| 337,188 | 3/86 | Nicol | 40—68 |
| 1,728,079 | 9/29 | Power | 40—39 |
| 1,794,740 | 3/31 | Smith | 40—39 |

JEROME SCHNALL, *Primary Examiner.*